Figure 1:
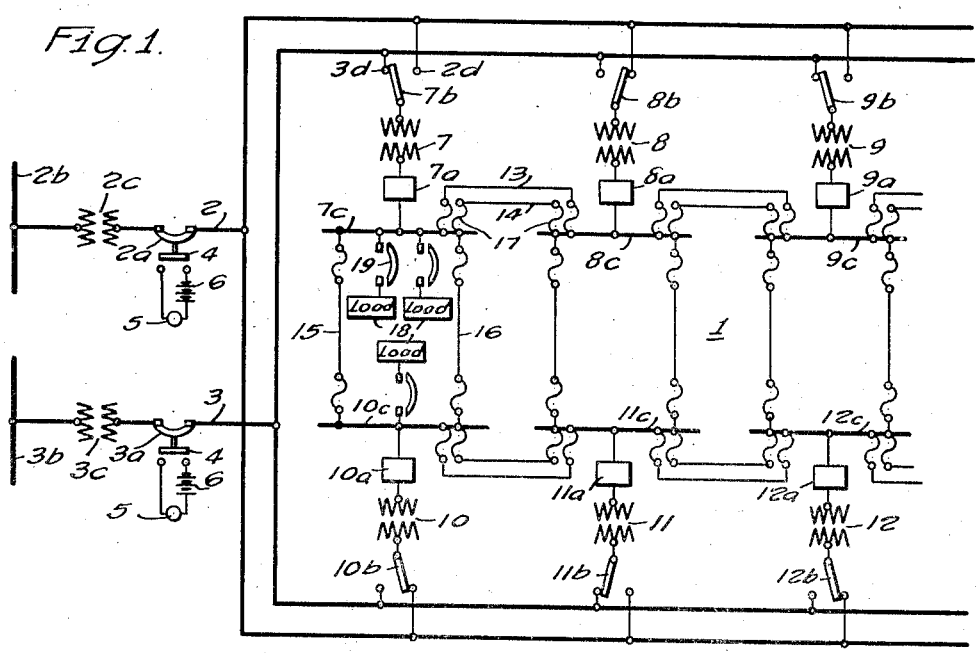

Nov. 3, 1942.    J. S. PARSONS    2,300,465
ELECTRICAL DISTRIBUTION SYSTEM
Filed Nov. 12, 1941    2 Sheets-Sheet 1

WITNESSES:
E. A. McCloskey
C. L. Freedman

INVENTOR
John S. Parsons
BY
ATTORNEY

Nov. 3, 1942.  J. S. PARSONS  2,300,465
ELECTRICAL DISTRIBUTION SYSTEM
Filed Nov. 12, 1941  2 Sheets-Sheet 2
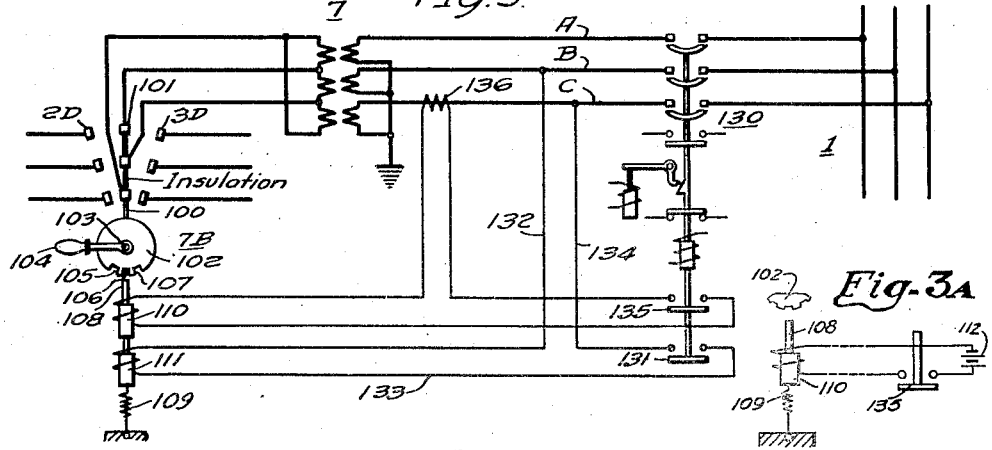
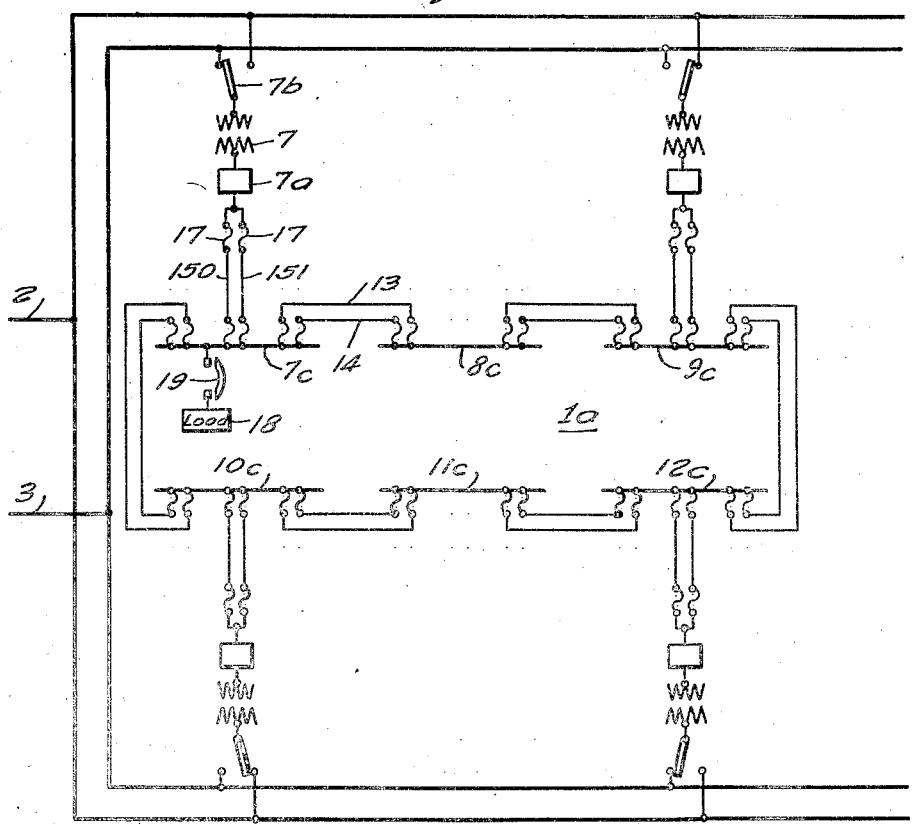
WITNESSES:
INVENTOR
John S. Parsons.
BY
ATTORNEY Patented Nov. 3, 1942

2,300,465

UNITED STATES PATENT OFFICE 2,300,465

ELECTRICAL DISTRIBUTION SYSTEM

John S. Parsons, Swissvale, Pa., assignor to Westinghouse Electric & Manufacturing Company, East Pittsburgh, Pa., a corporation of Pennsylvania Application November 12, 1941, Serial No. 418,729

20 Claims. (Cl. 171—97)

This invention relates to electrical distribution systems, and it has particular relation to network distribution systems wherein a common network circuit or grid is supplied with electrical energy from a plurality of feeder circuits.

Network circuits are widely employed for supplying electrical energy to areas having high load densities such as urban areas. Such network systems may take the form of primary network systems or secondary network systems, examples of which are shown in my Patents Nos. 1,997,597 and 1,955,311.

As generally designed, a network system includes a network circuit or grid which is supplied with electrical energy from a plurality of feeder circuits. Each feeder circuit generally is connected to the network circuit or grid through a plurality of transformers which may be termed "network transformers." When a fault occurs on one of the feeder circuits, the faulty feeder circuit, together with the network transformers associated therewith, are removed from service. The network circuit or grid in this case continues to receive electrical energy from the network transformers associated with the remaining feeder circuit or feeder circuits. A characteristic of this system is that substantially no interruption in continuity of service results from the withdrawal of a faulty feeder circuit from service.

In prior art network systems it has been necessary to provide network transformers having substantial reserve or spare capacity. This requirement may be understood by considering the case of a network circuit having two primary feeder circuits. When one of the primary feeder circuits, together with its associated transformers, is removed from service, the entire network circuit or grid load must be energized from the network transformers associated with the remaining feeder circuit. This means that to carry the rated load of the network circuit or grid the network transformers remaining in service must have a capacity 100% greater than the capacity normally required.

Similarly, the spare or reserve capacity of the transformers may be computed for network systems having more than two feeder circuits. For example, a network system having three feeder circuits should have a transformer capacity fifty per cent greater than the normal network circuit or grid load to provide adequate service when one feeder circuit is removed from service. As a further example, a network system having four feeder circuits requires a transformer capacity thirty-three and one-third per cent greater than the normal rated load of the network circuit or grid.

The reserve or spare transformer capacity is objectionable for several reasons. Not only does it add substantially to the cost of the transformers, but it adds appreciably to the weight and space requirements thereof. The factor of cost is particularly troublesome in small network system installations such as those for industrial manufacturing plants. The factors of space, weight and cost all are of importance in installations such as those on steamships.

In accordance with the invention, network transformers are provided with switching means which permit the connection of each network transformer to any of a plurality of feeder circuits. Consequently, when a feeder circuit is removed from service, the network transformers associated with such feeder circuit may be connected to a remaining feeder circuit. Since a transformer may be operated at a very substantial overload for a short time, that is from 30 minutes to one hour, without harm, the network transformers associated with the feeder circuit or circuits remaining in service are able to carry the entire network circuit or grid load until the network transformers associated with the feeder circuit removed from service are connected to a remaining feeder circuit. With such a system, all network transformers are available for service at all times. For this reason substantially no reserve or spare transformer capacity is required.

In accordance with a further aspect of the invention, the switching means for controlling the connection of the network transformers to the feeder circuits preferably is operable only when carrying currents substantially lower than the rated load current of the switching means or associated network transformer. Generally, a network transformer, its switching means, and a network protector for controlling the connection of the network transformer to a network circuit or grid all will be located in proximity to each other. Conveniently, all three may be provided with a common enclosure. Because of this association of the various parts, the desired operation of the switching means conveniently may be obtained by interlocking the switch means with its associated network protector. Such interlocking prevents operation of the switching means unless the associated network protector is in open condition. Therefore, the maximum current that the switching means and its associated network transformer carry during an operation of the switching means is restricted to the magnetizing current of the transformer.

The invention further contemplates a network circuit or grid wherein a single fault occurring on the network circuit or grid generally is insufficient to break the grid. To this end each network protector may be provided with a load bus. If desired additional load buses may be provided intermediate the network protectors. Adjacent pairs of load buses are connected by a plurality of connecting circuits, each of which preferably is provided with current-limiting means such as fuses. Should a fault occur on one of the connecting circuits, the remaining connecting circuit or connecting circuits suffice to maintain an unbroken network circuit or grid.

It is therefore an object of the invention to provide an improved network distribution system.

It is a further object of the invention to provide a network distribution system having switching means operable for selectively connecting each network transformer with any of a plurality of feeder circuits.

It is a still further object of the invention to provide a network distribution system having switching means for selectively connecting each network transformer to any of a plurality of feeder circuits operable only when carrying substantially less than its normal rated load current.

It is another object of the invention to provide a network distribution system having network transformers selectively connectible to any of a plurality of feeder circuits and having an adjacent pair of network transformers connected through the network circuit by means of a plurality of connecting network circuits.

It is still another object of the invention to provide a network circuit formed of a load bus associated with each network transformer and having a plurality of connecting circuits extending between each adjacent pair of load buses.

Still another object of the invention is to provide a network distribution unit including a transformer having a network protector associated with a secondary winding thereof and having a switch operable for connecting the primary winding of the transformer to any of a plurality of circuits only when the switch carries substantially no current.

Figure 2:
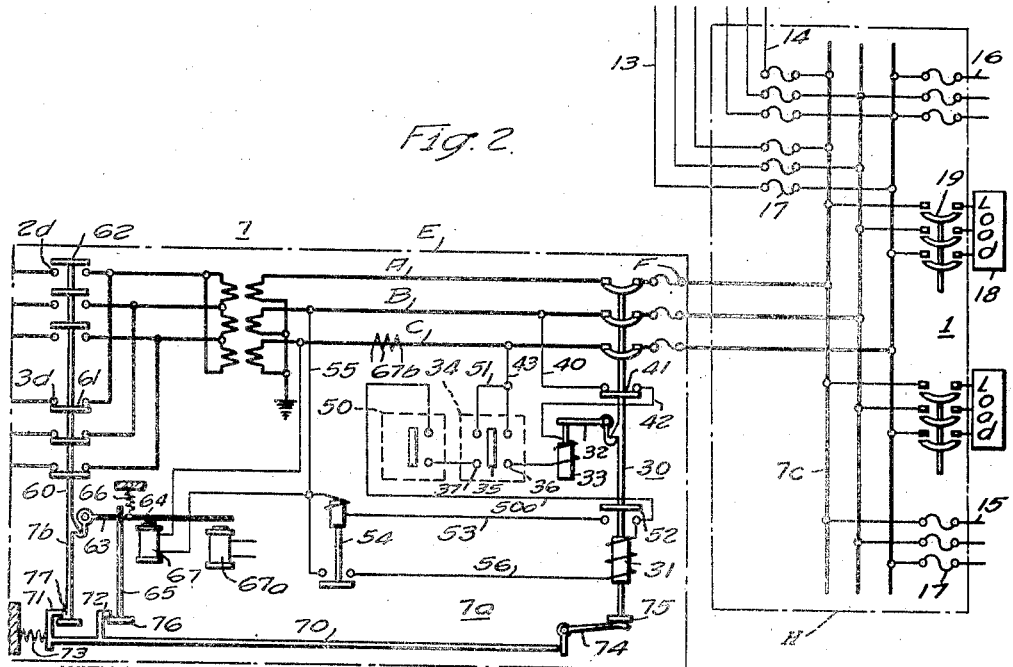

Other objects of the invention will be apparent from the following description taken in conjunction with the accompanying drawings in which:

Figure 1 is a schematic view in single line of a network distribution system embodying the invention, Fig. 2 is a schematic view in greater detail of a portion of the system shown in Fig. 1, Fig. 3 is a schematic view showing a modification of the portion of the system shown in Fig. 2, Fig. 3a is a schematic view showing a modification of the portion of the system shown in Fig. 3, and Fig. 4 is a schematic view showing a modification of the system illustrated in Fig. 1.

Referring to the drawings, Fig. 1 shows an electrical distribution circuit including a secondary network circuit or grid 1 which is energized from a plurality of feeder circuits 2 and 3. This system may be designed for single phase or polyphase operation. For purposes of illustration, it is assumed that the system of Fig. 1 is a three-phase alternating current system operating at a frequency of 60 cycles per second.

Each of the feeder circuits 2 and 3 is provided with a feeder circuit breaker 2a or 3a for controlling the connection of the associated feeder circuit to a suitable source of energy. Each of the feeder circuit breakers is designed to trip automatically in response to the condition of the associated feeder circuit when a fault occurs thereon. If the distribution system is of small extent, such as a system designed for a small factory, each of the feeder circuit breakers may be of the manual reclosing type.

If the distribution system is such that a fault occurring on the feeder circuit in certain cases may be self-clearing, each of the feeder circuit breakers preferably is of an automatic reclosing type. As an example of a suitable reclosing circuit breaker, such a breaker may reclose automatically three times after an initial tripping operation thereof at different time intervals. If a fault responsible for a tripping of the feeder circuit breaker fails to clear within the reclosing cycle thereof, the feeder circuit breaker then locks out in its open condition. Circuit breakers of this type are well known in the art.

Opening of a feeder circuit breaker may be indicated by a suitable signal device. For example, each feeder circuit breaker may be provided with back contacts 4 for closing a local circuit including a signal device 5 and a source of energy such as a battery 6. The signal device 5 may be in the form of an electric bell or lamp.

A suitable source of energy for the feeder circuits 2 and 3 is represented in Fig. 1 by buses 2b and 3b. These buses may represent portions of a common bus structure or may represent completely independent sources of energy. If the voltage of the buses is equal to that desired for the feeder circuits 2 and 3, the feeder circuit may be connected directly thereto through the feeder circuit breakers. However, if the voltage of the buses is higher than that desired for the feeder circuits, feeder transformers 2c and 3c may be interposed between the feeder circuit breakers and the associated buses. As a specific example, the buses 2b and 3b may be energized at 66,000 volts, whereas the feeder circuits 2 and 3 are energized at 4,000 or 13,200 volts. Such voltages may be phase-to-phase voltages.

Connection of the network circuit or grid 1 to the feeder circuits is effected through a plurality of network transformers 7, 8, 9, 10, 11 and 12. In Fig. 1 the primary windings of the network transformers 7, 9 and 11 are connected to the feeder circuit 3. The primary windings of the remaining transformers are connected to the feeder circuit 2. For controlling the connections of the network transformers to the network circuit or grid 1, a network protector 7a, 8a, 9a, 10a, 11a or 12a is interposed between the secondary winding of each network transformer and the network circuit or grid. The network circuit or grid may operate at a relatively low voltage, such as a phase-to-phase voltage of 208 or 440 volts.

As well understood in the art, a network protector generally is designed to remain closed when a fault occurs on the associated network circuit or grid. However, when a fault occurs on the associated feeder circuit, electrical energy flows from the network circuit or grid to the fault through one or more network protectors. This reversal in the direction of energy flow through a network protector, trips the network protector to disconnect the faulty feeder circuit from the network circuit or grid. In certain cases, it may be desirable to trip a network protector in response to excessive current flow therethrough to a network circuit or grid for appreciable periods of time. An example of a suitable network protector is described in greater detail in my Patent 2,082,024.

When a permanent fault occurs on one of the feeder circuits, the faulty feeder circuit and all network transformers associated with the faulty feeder circuit are removed from service. As previously explained, this means that to provide full service for the network circuit or grid 1, the remaining network transformers must be capable of supplying the full rated load of the network circuit or grid. Under such circumstances, each of the network transformers must have a capacity which is considerably greater than that required when all network transformers are in operation. For example, in the case of Fig. 1, each of the network transformers must have a reserve or spare capacity equal to one hundred per cent of the normal load carried thereby.

To eliminate the requirement for reserve or spare transformer capacity, the primary winding of each of the network transformers is provided with a switch 7b, 8b, 9b, 10b, 11b, or 12b through which the associated network transformer may be selectively connected to either of the feeder circuits. For example, adjacent the switch 7b the feeder circuits 2 and 3 are provided with contacts 2d and 3d which may be selectively engaged by the switch 7b. If desired, each of the switches may also include a neutral position wherein the switch is disconnected from both of the feeder circuits.

When switches are provided as indicated in the preceding paragraph, each of the feeder circuits serves as a normal energizing source for half of the network transformers and as an emergency energizing source for the remaining network transformers. Should a permanent fault occur on one of the feeder circuits, the network transformers normally associated with the faulty feeder circuit may be connected to the remaining feeder circuit. In this case, all network transformers would be connected to a single feeder circuit, and would be all available for supplying electrical energy to the network circuit or grid 1. For this reason substantially no reserve or spare transformer capacity is required.

Conveniently, the operation of the switches 7b to 12b may be entirely manually controlled. Such control is entirely adequate for small distribution systems. If desired, however, the movement of each switch from its normal connection to its emergency connection may be automatic, as in response to loss of voltage on its normal feeder circuit.

Generally, each transformer with its associated network protector and switch may be located adjacent each other. With such a positioning of the apparatus, a common enclosure may be provided with each network transformer and its associated network protector and switch.

Complexity, space, weight and cost requirements of each switch may be materially reduced if operation of the switch takes place only when the switch carries substantially less than its normal rated load current. When the switch is located adjacent its associated network protector, such operation may be assured by suitably interlocking the switch with the network protector.

If the switch can operate only when its associated network protector is in an open condition, the maximum current flowing through the switch during an operation thereof is the relatively small magnetizing current of the associated network transformer. Consequently the switch does not require a complicated structure for interrupting large currents. As a matter of fact, since the switch normally will be operated only when a fault occurs on the associated feeder circuit, substantially no current flows therethrough at the time of operation thereof if the associated network protector is open.

Although the network circuit or grid 1 may be of conventional construction, a novel construction is shown in Fig. 1 which, together with the switches 7b to 12b, contributes to optimum performance of the distribution system under all conditions of operation.

The network circuit or grid 1 includes a load bus 7c, 8c, 9c, 10c, 11c or 12c for each of the network transformers. Each adjacent pair of load buses is connected by a plurality of connecting circuits. For example, the load buses 7c and 8c are connected by a pair of connecting circuits 13 and 14. As a further example, the load buses 7c and 10c are connected by a pair of connecting circuits 15 and 16. The load buses, together with the connecting circuits, form a solidly interconnected network circuit or grid. Each of the connecting circuits preferably is suitably segregated, as in a separate duct. With such segregation a fault on one connecting circuit does not affect the remaining connecting circuit. For example, if the connecting circuits 13 and 14 are three-phase circuits, the three phase-conductors of each of these circuits (together with the associated neutral conductor if four-wire distribution is employed) are installed in a separate conduit.

The advantages derived from the provision of a plurality of connecting circuits may be shown by an example. Should a fault occur on one of the connecting circuits, such as the circuit 13, the resultant flow of current to the fault operates to burn clear the connecting circuit 13 from the remaining circuit or grid. However, since the associated connecting circuit 14 remains intact, the remaining circuit or grid is not opened at any point.

Moreover, the provison of a plurality of connecting circuits may actually save copper. For example, assume that the connecting circuits 13 and 14 are formed of conductor having a 212,000 circular mil cross-section (this corresponds to a 4/0 conductor). A pair of such conductors has a higher current capacity than a single conductor having a 500,000 circular mil cross-section. Therefore, the provision of a plurality of connecting circuits not only improves the operation of the distribution system, but it may result in a saving in copper. Such a system also provides improved regulation at low power factors.

Small distribution systems may not have sufficient available energy to burn clear faults occurring on the connecting circuits. For this reason it may be desirable to provide current limiters 17 at each end of a connecting circuit. A current limiter may take the form of a heavy copper fuse or a weak link which opens with the customary fuse time delay when current above the normal rated capacity thereof passes therethrough. Such current limiters assure the removal of a faulty connecting circuit from service.

As a general rule, the load buses 7c to 12c are relatively short compared to the connecting circuits. For this reason it is generally possible to provide additional insulation for the load buses. Consequently, the possibility of a fault at a load bus may, generally, be ignored.

Although loads may be connected to the connecting circuits, preferably the loads are connected directly to the load buses 7c to 12c. For example, in Fig. 1, loads 18 are connected to the load buses 7c and 10c. If desired, each load may be connected to its associated load bus through an automatic circuit breaker 19. The loads may represent any desirable electric load such as electric lighting or electric motors. Preferably the load limiters 17 are completely enclosed. Conveniently each load bus 7c, 8c, 9c, 10c, 11c or 12c and all of its adjacent load limiters 17 may be enclosed in a suitable cabinet or enclosure H (represented in Fig. 2 by broken lines) provided with terminals for receiving connecting circuits, load circuits and protector connections.

It is believed that operation of the distribution system shown in Fig. 1 is clear from the foregoing description. Under normal operating conditions, the network transformers 7, 9 and 11 are connected to receive electric energy from the feeder circuit 3. The network transformers 8, 10 and 12 are connected to receive electric energy from the feeder circuit 2. Consequently, all network transformers are in service to supply electric energy to the network circuit 1.

Should a fault occur at one of the loads 18, the circuit breaker 19 associated with the faulty load opens to disconnect the load from its associated load bus. Except for the faulty load, the distribution system continues in normal operation.

In the event that a fault occurs on one of the connecting circuits such as the connecting circuit 13, excessive current flows to the connecting circuit from the rest of the network circuit or grid 1. This excessive current operates to blow the current limiters at each end of the connecting circuit 13. Since the associated connecting circuit 14 remains intact, the network circuit or grid 1 remains unbroken, and the system continues in operation except for the connecting circuit 13.

As previously pointed out, it is extremely unlikely that faults can occur on the load buses. For completeness, however, it is here assumed that a fault occurs on the load bus 7c. The resulting flow of current to the faulty load bus through the connecting circuits 13, 14, 15 and 16 results in the blowing of at least one current limiter in each of these connecting circuits. This effectively isolates the load bus 7c from the remainder of the network circuit or grid 1.

The performance of the network protector 7a depends upon its construction. If it is designed to trip in response to excessive current flowing therethrough, it will open to isolate the load bus 7c from the feeder circuits. Such operation of the network protector removes the network transformer 7 from service and permits the remainder of the network circuit or grid 1 to continue in operation, receiving energy from the network transformers 8 to 12.

Assuming that the network protector 7a trips only in response to a reversal in the direction of energy flow therethrough, the fault on the load bus 7c will not result in an opening of the network protector 7a. In such a case, fuses generally provided in the network protector "blow" to remove the protector from service.

A fault occurring on one of the feeder circuits such as the feeder circuit 3 results in a flow of electric energy from the network circuit or grid 1, through the network protectors 7a, 9a and 11a. The reversal in the direction of energy flow through these protectors opens the protectors to disconnect the associated network transformers from the network circuit or grid.

The fault on the feeder circuit 3 also results in a tripping of the feeder circuit breaker 3a. If the feeder circuit breaker 3a is of the automatic reclosing type, it immediately enters its reclosing cycle. Should the fault on the feeder circuit 3a clear before the completion of the reclosing cycle, the feeder circuit breaker 3a recloses and remains closed. The closure of the feeder circuit breaker places the network transformers 7, 9 and 11 in condition to supply electric energy to the network circuit or grid 1. If the associated network protectors are of the manual reclosing type, a manual reclosure of each of these network protectors restores the entire system to its normal condition. If the network protectors 7a, 9a and 11a are of the automatic reclosing type, they reclose automatically to restore the entire system to its normal condition.

However, if the fault occurring on the feeder circuit 3 is of permanent nature or if the feeder circuit breaker 3a is of the manually reclosing type, the feeder circuit breaker remains in its open condition. If the switches 7b, 9b and 11b are automatic in operation, they then transfer to their emergency connection, thereby connecting their associated transformers to the feeder circuit 2. In the event the circuit breaker 3a is of the automatic reclosing type, preferably this operation of the switches is accompanied by a time delay in order to permit the circuit breaker to go through its reclosing cycle.

If the switches 7b, 9b and 11b are of the manually operable type, an attendant operates these switches to connect the associated transformers to the sound feeder circuit 2. Such operation of the circuits restores all of the network transformers to service, and eliminates the requirement for reserve or spare capacity thereof. Since a transformer generally has a high overload capacity for short periods, the transformers 8, 10 and 12 are capable of carrying the network circuit or grid load until the switches 7b, 9b and 11b are operated.

After the feeder circuit 3 has been repaired, the switches 7b, 9b and 11b may be manually restored to the positions illustrated in Fig. 1. The system then may be placed in condition for its normal operation.

In Fig. 2, the load bus 7c and the equipment associated therewith are illustrated in greater detail. Conveniently, the transformer 7 may have a delta-connected primary winding and a star-connected secondary winding. However, other suitable connections thereof may be employed. Fuses F may be provided between the transformer and the network circuit. These fuses "blow" only if subjected to excessive current for a time sufficient to permit prior operation of the associated protector or the network circuit current limiters or fuses 17.

The network protector 7a includes a network circuit breaker 30 having a closing motor or solenoid 31. The network circuit breaker 30 is held in closed position by means of a tripping latch 32 which is operated by a tripping solenoid 33.

The tripping of the network circuit breaker 30 is controlled by a directional master relay 34 having a movable contact 35 which may be actuated into engagement with either a pair of tripping contacts 36 or a pair of closing contacts 37. Engagement of the movable contact 35 with the tripping contacts 36 completes a tripping circuit for the tripping solenoid 33 which may be traced from a phase conductor B of the associated polyphase circuit through a conductor 40, front contacts of a pallet switch 41, a conductor 42, the energizing coil of the tripping solenoid 33, the tripping contacts 36 and a conductor 43 to a second phase conductor C of the associated circuit.

The design of the master relay 34 is well known in the art. For example, suitable constructions for the master relay are shown in my Patents 1,973,097 and 2,013,836.

Although the network circuit breaker 30 may be manually reclosed, preferably it is automatically reclosed when the conditions across its poles are such that energy will flow from the associated feeder circuit to the network circuit or grid. For controlling the closure of the network circuit breaker, a phasing relay 50 may be employed in addition to the master relay 34. A suitable construction for the phasing relay 50 is shown in somewhat greater detail in my Patents 1,997,697 and 2,082,024.

If the network circuit breaker 30 is in open condition and if the conditions across its poles are such that electric energy will be supplied from the associated feeder circuit to the network circuit or grid, a closing circuit for the network circuit breaker is set up which may be traced from the phase conductor C through the conductor 43, a conductor 51, the closing contacts 37 of the master relay, the contacts of the phasing relay, back contacts of a pallet switch 52, a conductor 53, the energizing winding of a closing relay 54 and a conductor 55 to the phase conductor B. Upon completion of this circuit, the closing relay 54 picks up to close its front contacts. Closure of the front contacts of the closing relay 54 completes a circuit for the closing motor or solenoid 31 which may be traced from the phase conductor C through the conductor 43, the conductor 51, the closing contacts 37 of the master relay, the contacts of the phasing relay, the conductor 50a, the energizing winding of the motor or solenoid 31, a conductor 56, the front contacts of the closing relay 54, and the conductor 55 to the phase conductor B. Completion of this circuit results in the closure of the circuit breaker 30.

The switch 7b may take the form of an operating rod 60 having a plurality of contacts 61 normally in engagement with the front contacts 3d. The rod 60 also carries a plurality of contacts 62 for engaging the back contacts 2d. Under normal conditions of operation, the contacts 61 are maintained in engagement with the front contacts 3d by means of a latch 63 having an operating arm 64. Tripping of the latch 63 permits the switch 7b to drop. Such dropping of the switch opens the front contacts 3d and closes the back contacts 2d. Operation of the latch 63 may be effected through an operating rod 65 having an opening or eye through which the arm 64 extends. Movement of the operating rod 65 in an upward direction as viewed in Fig. 2 trips the switch 7b to actuate the switch from its normal condition illustrated in Fig. 2 to its emergency position wherein the back contacts 2d are closed.

As previously explained, the switch 7b generally may be designed for manual operation. In certain cases, however, automatic operation of the switch may be desired. In such cases, a spring 66 may be added for biasing the tripping latch 63 towards its tripping position. A solenoid 67 may be connected across the phase conductors B and C. For this case the arm 64 is formed of magnetic material. The solenoid, when energized, operates to maintain the tripping latch 63 in latching position. The relationship between the spring 66 and the solenoid 67 is such that for normal values of voltage the solenoid 67 exerts a predetermined torque maintaining the tripping latch 63 in latching position. When the voltage applied to the solenoid 67 drops below a predetermined value such as thirty per cent of normal, the torque exerted by the spring 66 overcomes the torque exerted by the solenoid and moves the tripping latch into tripping position. This permits the switch 7b to drop from its normal to its emergency position. A fault near the network protector 7a may drop the voltage applied to the solenoid 67 sufficiently to permit a tripping operation of the switch 7b despite the fact that the switch is carrying substantial current. To avoid such operation an additional solenoid 67a may be energized from a current transformer 67b (connections not shown in full) to prevent tripping of the latch 63 when the switch carries substantial current. Under such conditions the solenoid 67a retains the magnetic arm 64 in its latching position against the pull of the spring 66.

As a general rule, the switch 7b, the network transformers, and the network protector 7a may be grouped into a compact unit provided with a common enclosure E represented in Fig. 2 by broken lines.

As previously explained, it is desirable that the switch 7b be operable only when the current flowing through the switch is substantially below the rated load current thereof. With the grouping of parts illustrated in Fig. 2, such control of the switch 7b conveniently may be effected by interlocking the switch 7b with the network circuit breaker 30. This interlocking permits operation of the switch 7b only when the network circuit breaker 30 is in open condition. With such interlocking, the maximum current passing through the switch 7b during an operation thereof is restricted to the magnetizing current flowing to the network transformer 7.

For interlocking the switch 7b with the circuit breaker 30, an interlocking rod 70 is provided which extends between the switch 7b and the network circuit breaker 30. This rod is provided with two latching fingers 71 and 72 which are urged towards latching position by means of a suitable spring 73. Movement of the latching fingers 71 and 72 away from latching position is effected by a bell crank 74 having an arm extending beneath a disk 75 carried by the network circuit breaker 30.

When the network circuit breaker 30 is in its closed position, the spring 73 urges the rod 70 to the right as viewed in Fig. 2. This is the direction of movement required to bring the latching fingers 71 and 72 into latching position. When the circuit breaker 30 opens, engagement of the disk 75 with the bell crank 74 operates the bell crank in a clockwise direction, as viewed in Fig. 2, to urge the rod 70 towards the left against the bias of the spring 73. Such movement of the rod 70 carries the latching fingers 71 and 72 out of latching engagement with the switch rod 60 and the operating rod 65.

By inspection of Fig. 2, it will be observed that the latching finger 72 normally overhangs a disk 76 carried by the operating rod 65. Similarly the latching finger 71 is positioned for movement over a lug 77 carried by the switch rod 60.

With the parts in the positions shown in Fig. 2, the latching finger 72 prevents the actuation of the operating rod 65 either manually or by the spring 66 to trip the switch 7b. Tripping of the circuit breaker 30 is required to actuate the rod 70 and the latching finger 72 out of latching position. Therefore the switch 7b cannot be tripped unless the circuit breaker 30 is in open condition.

When the switch 7b trips, the lug 77 drops sufficiently to permit the latching finger 71 to move over the lug 77. Reclosure of the network circuit breaker 30 permits the spring 73 to move the latching finger 71 into latching position over the lug 77. In this position the latching finger 71 prevents operation of the switch rod 60 in an upward direction as viewed in Fig. 2. It should be noted that the upward motion of the operating rod 65 is sufficient to carry the disk 76 above the latching finger 72. This permits the rod 70 to move freely to the right, when the circuit breaker 30 is closed, in order to bring the latching finger 71 over the lug 77. The latching finger 71 remains over the lug 77 as long as network circuit breaker 30 is in closed condition. Therefore, the network circuit breaker 30 must be opened before the switch 7b can be restored to the position illustrated in Fig. 2.

From the foregoing discussion it will be appreciated that the switch 7b can be operated only when the network circuit breaker is in open condition. Therefore, the switch 7b need not be designed to interrupt substantial current, and a considerable saving in complexity, space, weight and cost may be effected. Since the interlock permits operation of the switch 7b only when the protector is open, the solenoid 67a may be omitted, if desired, when such an interlock is provided.

In Fig. 2 a mechanical interlock is illustrated for preventing operation of the switch 7b if the circuit breaker 30 is closed. If desired, this mechanical interlock may be replaced by an electrical interlock such as that illustrated in Fig. 3.

Referring to Fig. 3, a switch 7B is disclosed which corresponds to the switch 7b of Fig. 2. This switch 7B includes an arm 100 formed of insulating material and carrying three contacts 101 which are connected respectively to the primary terminals of the transformer 7. The arm 100 is attached to a drum 102 which is rotatable about a shaft 103. A suitable handle 104 may be attached to the drum for rotating the drum and the arm 100 about the shaft 103. Operation of the handle 104 serves to move the contacts 101 carried by the arm 100 from their open positions illustrated in Fig. 3 into engagement with a set of contacts 2D or 3D. These contacts 2D and 3D correspond to the contacts 2d and 3d of Fig. 2.

In order to interlock the switch 7B against movement while carrying substantial current, the drum 102 may be provided with three notches 105, 106 and 107. A pin 108 is positioned to enter one of the notches to prevent rotation of the drum 102. The pin 108 is mounted for reciprocation in a vertical direction, as viewed in Fig. 3. A spring 109 is provided for biasing the pin 108 away from the drum 102.

Actuation of the pin 108 towards the drum 102 is effected by a pair of solenoids 110 and 111. Proper energization of either or both of the solenoids actuates the pin 108 against the bias of the spring 109 into one of the notches 105, 106 or 107. In Fig. 3, a circuit breaker 130 which corresponds to the circuit breaker 30 of Fig. 2, is employed for connecting the secondary of the transformer 7 to the network circuit or grid 1. As previously explained, it is desirable that operation of the switch 7B be permitted only when the circuit breaker 130 is in open condition. To this end, the circuit breaker 130 is provided with a pallet switch 131 having front contacts. When the circuit breaker 130 is in closed condition, the pallet switch 131 completes an energizing circuit for the winding of the solenoid 111. This energizing circuit may be traced from the phase conductor B through a conductor 132, the winding of the solenoid 111, a conductor 133, the pallet switch 131 and a conductor 134 to the phase conductor C. Consequently, when the circuit breaker 130 is in closed condition, the solenoid 111 is energized to urge the pin 108 into one of the notches 105, 106 or 107, thereby preventing actuation of the switch 7B.

When the circuit breaker 130 opens, the energizing circuit for the solenoid 111 is interrupted at the pallet switch 131. Consequently, the spring 109 urges the pin 108 out of its interlocking engagement with the drum 102 and permits operation of the switch 7B.

Since a fault occurring near the circuit breaker 130 may drop the voltage applied to the solenoid 111 sufficiently to permit the spring 109 to withdraw the pin 108 from its interlocking engagement with the drum 102, it may be desirable to provide an additional control for the pin 108. To this end, the circuit breaker 130 may have a second pallet switch 135 which also has front contacts. Closure of the pallet switch 135 completes an energizing circuit from a current transformer 136 associated with the phase conductor C to the solenoid 110. The energization of the solenoid 110 is designed to maintain the pin 108 in its interlocking engagement with the drum 102 against the bias of the spring 109 when the circuit breaker 130 is closed and substantial current flows through the primary of the current transformer 136.

It should be observed that operation of the switch 7B is permitted only when the switch carries substantially no current. For this reason, the switch may be designed with interrupting capacity only sufficient for the magnetizing current of the transformer 7. If an auxiliary source of energy, such as a battery 112 (see Fig. 3a), is available only one of the solenoids 110 or 111 need be employed. Such a solenoid may be connected to the battery through one of the pallet switches 131 or 135.

In Fig. 4, a network distribution system is illustrated which corresponds to Fig. 1 except for the changes hereinafter set forth. Referring more particularly to Fig. 4, it will be observed that no tie circuits or connecting circuits extend directly between the load buses 8c and 11c. Consequently, the load buses and connecting circuits in Fig. 4 form a secondary network circuit 1a which is in effect a loop circuit.

Such a loop circuit has certain advantages for small network installations such as those designed for industrial manufacturing plants. Because of the elimination of the connecting circuits between the load buses 8c and 11c, the short circuit current to a fault occurring on the secondary network circuit 1a is restricted to a reasonable maximum value. Moreover, the use of the secondary loop circuit generally results in a more uniform overloading of the network transformers which remain energized immediately after one of the primary feeder circuits is removed from service. If a single secondary loop circuit is inadequate for a specific installation, additional similar secondary loop circuits may be connected for energization from the same or other feeder circuits. Secondary network circuits in the form of loop circuits are set forth in my copending application, Serial No. 342,938, filed June 28, 1940, and assigned to the same assignee.

As shown in Fig. 4, the load buses 8c and 11c are not directly connected to network protectors and network transformers. In other words, load buses may be incorporated in the network circuit as desired between adjacent points of connection of network transformers and network protectors to the secondary network circuit.

In some installations, the network protectors may be spaced appreciably from their associated load buses. In such cases, it may be desirable to connect each of the network protectors to its load bus through a plurality of independent circuits. For example, in Fig. 4 the network protector 7a is connected to the load bus 7c through two independent circuits 150 and 151. Current limiters or fuses 17 are provided at each end of each of the circuits 150 and 151.

Although the invention has been described with reference to certain specific embodiments thereof, numerous modifications of the invention are possible. Therefore, the invention is to be restricted only by the appended claims.

I claim as my invention:

1. In an electrical distribution system, a plurality of feeder circuits, a distribution circuit, a plurality of transformers for electrically connecting said distribution circuit to said feeder circuits, and switch means for selectively connecting each of said transformers to any of said feeder circuits.

2. In an electrical distribution system, a plurality of feeder circuits, a network loop circuit, a plurality of network transformers for electrically connecting each of said feeder circuits to said network loop circuit, and a switch for each of said transformers, each of said switches including means operable for transferring the associated transformer from one of said feeder circuits to another of said feeder circuits.

3. In an electrical distribution system, a first feeder circuit, a second feeder circuit, a separate feeder circuit breaker for connecting each of said feeder circuits to a source of energy, a first transformer having a primary winding normally connected to said first feeder circuit, a second transformer having a primary winding normally connected to said second feeder circuit, a network circuit, said transformers having secondary windings connected to said network circuit, switch means for each of said primary windings, each of said switch means being operable for transferring the associated primary winding from its normally connected feeder circuit to the other one of said feeder circuits, and a protector for controlling the connection of each of said secondary windings to the network circuit, each of said protectors including means effective for disconnecting the associated secondary winding from the network circuit when a fault occurs on the feeder circuit coupled to the associated secondary winding.

4. In an electrical distribution system, a plurality of feeder circuits, a network circuit, a plurality of transformers for electrically connecting said network circuit to said feeder circuits, selective means for selectively connecting each of said transformers to any of said feeder circuits, and means permitting operation of said first named means for transferring one of said transformers from one of said feeder circuits to another of said feeder circuits only when said one transformer is carrying substantially less than its rated load current.

5. In an electrical distribution system, a plurality of feeder circuits, a network circuit, a plurality of network transformers for electrically connecting each of said feeder circuits to said network circuit, a switch for each of said transformers, each of said switches including means operable for transferring the associated transformer from one of said feeder circuits to another of said feeder circuits, a circuit breaker for controlling the connection of each of said transformers to said network circuit, and means permitting operation of one of said switches only when the associated circuit breaker is in open condition.

6. In an electrical distribution system, a first feeder circuit, a second feeder circuit, a separate feeder circuit breaker for connecting each of said feeder circuits to a source of energy, a first transformer having a primary winding normally connected to said first feeder circuit, a second transformer having a primary winding normally connected to said second feeder circuit, a network circuit, said transformers having secondary windings connected to said network circuit, switch means for each of said primary windings, each of said switch means being operable for transferring the associated primary winding from its normally connected feeder circuit to the other one of said feeder circuits, a protector for controlling the connection of each of said secondary windings to the network circuit, each of said protectors including means effective for disconnecting the associated secondary winding from the network circuit when a fault occurs on the feeder circuit connected to the associated secondary winding, and means permitting operation of each of said switches only when the current flowing therethrough is substantially less than the normal current carrying capacity thereof.

7. In an electrical distribution system capable of rendering substantially complete service with a portion thereof removed from operation, a first feeder circuit, a second feeder circuit, a separate feeder circuit breaker for connecting each of said feeder circuits to a source of energy, a first transformer having a primary winding normally connected to said first feeder circuit, a second transformer having a primary winding normally connected to said second feeder circuit, a network circuit including a plurality of load buses, and including a plurality of connecting circuits for connecting each pair of said load buses to form said network circuit, each of said transformers having secondary windings connected to a separate one of said load buses, switch means for each of said primary windings, each of said switch means being operable for transferring the associated primary winding from its normally connected feeder circuit to the other one of said feeder circuits, and a protector for controlling the connection of each of said secondary windings to the network circuit, each of said protectors including means effective for disconnecting the associated secondary winding from the network circuit when a fault occurs on the feeder circuit connected to the associated secondary winding.

8. In an electrical distribution system, a plurality of feeder circuits, a network circuit electrically connected at a plurality of points to said feeder circuits for energization therefrom, said network circuit comprising a plurality of connecting circuits extending between each adjacent pair of points of connection to said network circuit of said feeder circuits, and current responsive means in each of said connecting circuits for opening each connecting circuit when excessive current flows therethrough.

9. In an electrical distribution system, a plurality of feeder circuits, a network circuit electrically connected at a plurality of points to said feeder circuits for energization therefrom, said network circuit comprising a load bus at each point of connection to said network circuit of said feeder circuits, a plurality of connecting circuits extending between pairs of said load buses for forming with said load buses a network circuit, and current responsive means at each end of each of said connecting circuits for opening each connecting circuit when excessive current flows therethrough.

10. In an electrical distribution unit, a transformer having primary and secondary windings, switch means associated with the primary winding of the transformer for selectively connecting the transformer to any of a plurality of sources of electrical energy, a protector associated with the secondary winding of the transformer for controlling the connection of said transformer to a load circuit, and means permitting operation of said switch means only when said switch means carries substantially less than the normal rated current thereof.

11. In an electrical distribution unit, a transformer having primary and secondary windings, a plurality of electrical terminals, switch means associated with the primary winding of the transformer for selectively connecting the transformer to any of said electrical terminals, a protector associated with the secondary winding of the transformer for interrupting the connection of said transformer to a load circuit when the direction of energy flow through said transformer reverses, and interlocking means permitting a predetermined operation of said switch means only when said protector is in open condition.

12. In an electrical distribution system, a plurality of feeder circuits, a distribution circuit, a plurality of transformers for electrically connecting said distribution circuit to said feeder circuits, a switch for each of said transformers, each of said switches including means operable from a first condition connecting the primary winding of the associated transformer to one of said feeder circuits to a second condition connecting the primary winding to another of said feeder circuits, and a separate circuit breaker for controlling the connection of the secondary winding of each of said transformers to said distribution circuit.

13. In an electrical distribution system, a plurality of feeder circuits, a distribution circuit, a plurality of transformers for electrically connecting said distribution circuit to said feeder circuits, a switch for each of said transformers, each of said switches including means operable from a first condition connecting the primary winding of the associated transformer to one of said feeder circuits to a second condition connecting the primary winding to another of said feeder circuits, a separate circuit breaker for controlling the connection of the secondary winding of each of said transformers to said distribution circuit, and means permitting operation of one of said switches only when the current passing through the switch-to-be-operated is substantially less than the normal current carrying capacity thereof.

14. In an electrical distribution system, a plurality of feeder circuits, a distribution circuit including a plurality of buses, said distribution circuit also including a plurality of connecting circuits connecting each pair of said buses to form said distribution circuit, a plurality of transformers for electrically connecting said distribution circuit to said feeder circuits, a switch for each of said transformers, each of said switches including means operable from a first condition connecting the primary winding of the associated transformer to one of said feeder circuits to a second condition connecting the primary winding to another of said feeder circuits, and a plurality of circuit breakers connecting said transformers to said distribution circuit, each of said circuit breakers connecting the secondary winding of a separate one of said transformers to a separate one of said buses.

15. In an electrical distribution system, a plurality of feeder circuits, a distribution circuit including a plurality of buses, said distribution circuit also including a plurality of connecting circuits connecting each pair of said buses to form said distribution circuit, a plurality of transformers for electrically connecting said distribution circuit to said feeder circuits, a switch for each of said transformers, each of said switches including means operable from a first condition connecting the primary winding of the associated transformer to one of said feeder circuits to a second condition connecting the primary winding to another of said feeder circuits, a plurality of circuit breakers connecting said transformers to said distribution circuit, each of said circuit breakers connecting the secondary winding of a separate one of said transformers to a separate one of said buses, and current responsive means at each end of each of said connecting circuits for disconnecting each connecting circuit from its associated buses when excessive current flows therethrough.

16. In an electrical distribution system, a distribution circuit comprising a plurality of parallel circuits, a plurality of buses connecting said parallel circuits at spaced intervals, a plurality of feeder circuits for supplying electrical energy to said distribution circuit, means connecting a first one of said feeder circuits to certain of said buses, means connecting a second one of said feeder circuits to other of said buses, and current responsive means in each of said parallel circuits between each pair of said buses for disconnecting a portion of each parallel circuit between a pair of said buses from its associated buses when excessive current flows therethrough.

17. In an electrical distribution system, a distribution circuit comprising a plurality of parallel circuits each closed to form a loop circuit, a plurality of buses connecting said parallel circuits at spaced intervals, a plurality of feeder circuits for supplying electrical energy to said distribution circuit, means connecting a first one of said feeder circuits to certain of said buses, means connecting a second one of said feeder circuits to other of said buses, and current responsive means in each of said parallel circuits between each pair of said buses for disconnecting a portion of each parallel circuit between a pair of said buses from its associated buses when excessive current flows therethrough.

18. In an electrical distribution system, a plurality of feeder circuits, a distribution circuit, said distribution circuit comprising a plurality of load buses and connecting circuits extending between pairs of said load buses to form therewith a loop circuit, current responsive means at each side of each of said load buses for controlling the connection of said connecting circuits to said load buses, said current responsive means operating in response to an excessive flow of current to a faulty one of said connecting circuits to disconnect said faulty connecting circuit from its associated load buses, and means connecting said feeder circuits to said distribution circuit, said last-named means including transformers having secondary windings connected to at least certain of said load buses, the load buses to which all of the transformers energizing said distribution circuit are connected being connected to each other on the secondary sides of said transformers only through said loop circuit.

19. In an electrical distribution system, a plurality of feeder circuits, a distribution circuit, said distribution circuit comprising a plurality of load buses and connecting circuits extending between pairs of said load buses to form therewith a loop circuit, current responsive means at each side of each of said load buses for controlling the connection of said connecting circuits to said load buses, said current responsive means operating in response to an excessive flow of current to a faulty one of said connecting circuits to disconnect said faulty connecting circuit from its associated load buses, means connecting said feeder circuits to said distribution circuit, said last-named means including transformers having secondary windings connected to at least certain of said load buses, the load buses to which all of the transformers energizing said distribution circuit are connected being connected to each other on the secondary sides of said transformers only through said loop circuit, and separate circuit interrupting means for controlling the connection of said feeder circuits to said distribution circuit through each of said transformers, each of said circuit interrupting means including means responsive to the condition of the associated feeder circuit when a fault occurs thereon for interrupting the connection of said associated feeder circuit to the distribution circuit through the associated transformer.

20. In an electrical distribution system, a plurality of feeder circuits, a distribution circuit, said distribution circuit comprising a plurality of load buses and connecting circuits extending between pairs of said load buses to form therewith a loop circuit, current responsive means at each side of each of said load buses for controlling the connection of said connecting circuits to said load buses, said current responsive means operating in response to an excessive flow of current to a faulty one of said connecting circuits to disconnect said faulty connecting circuit from its associated load buses, means connecting said feeder circuits to said distribution circuit, said last-named means including transformers having secondary windings connected to at least certain of said load buses, the load buses to which all of the transformers energizing said distribution circuit are connected being connected to each other on the secondary sides of said transformers only through said loop circuit, separate circuit interrupting means for controlling the connection of said feeder circuits to said distribution circuit through each of said transformers, each of said circuit interrupting means including means responsive to the condition of the associated feeder circuit when a fault occurs thereon for interrupting the connection of said associated feeder circuit to the distribution circuit through the associated transformer, and switch means for each of said transformers, each of said switch means including means normally connecting its associated transformer to one of said feeder circuits and being operable for transferring its associated transformer to another of said feeder circuits.

JOHN S. PARSONS.